UNITED STATES PATENT OFFICE.

FRANK KLEPETKO AND JOHN T. MORROW, OF GREAT FALLS, MONTANA.

PROCESS OF REFINING COPPER FROM SOLUTIONS CONTAINING ANTIMONY AS AN IMPURITY.

SPECIFICATION forming part of Letters Patent No. 657,119, dated September 4, 1900.

Application filed January 18, 1898. Serial No. 667,095. (No specimens.)

*To all whom it may concern:*

Be it known that we, FRANK KLEPETKO and JOHN T. MORROW, of Great Falls, in the State of Montana, have invented certain new and useful Improvements in Processes for Refining Copper from Solutions Containing Antimony as an Impurity, of which the following is a description.

The invention has for one of its principal objects the electrolytic purification of copper upon a large scale. The present process used for this purpose at some of the largest copper-refining works in this country employs an electrolyte of sulfate of copper, sulfuric acid, and water, in which the impure copper is immersed and electrically connected as anode, while a thin plate of pure copper is used for cathode. Antimony, which is objectionable in copper for electrical conductors, is usually present in the impure anodes to a considerable degree, together with many other impurities, and as the copper is transferred electrolytically from anode to cathode the antimony and certain other of the impurities go into the solution. At first a lower oxid of antimony ($Sb_2O_3$) is probably formed, and later as the antimony accumulates in the solution the higher oxid $Sb_2O_5$ forms and produces an objectionable precipitate on the cathode. Moreover, the surface of the copper cathode becomes oxidized in spots. The purer copper as it deposits upon this becomes in turn spotted. In this manner, especially at high current density, the copper formed upon the cathodes is loose, sandy, or lumpy, and it lacks the high purity desired.

The present invention rests upon the discovery that if certain organic substances, such as wood-tea, are added to the electrolyte in moderate proportions, preferably about one or two per centum, by weight, of electrolyte, the objections enumerated are overcome to a great extent, and the character of the copper deposited at the cathode is materially changed and improved. It is smoother, denser, and purer. Fewer short circuits between electrodes occur, because of the tougher, smoother, denser, and more coherent metal deposited, and the efficiency of the plant is thereby increased. Furthermore, much damage and loss by the breaking or crumbling during shipping and handling of the copper is saved, and the conductivity and desirability of the copper for electric wires and other uses is increased.

The manner in which the organic substances act seems to be by a reducing action, which prevents the formation of the higher oxid of antimony and permits the accumulation of antimony in the solution to a very much greater extent without either its presence or the oxidizing of the cathode giving serious trouble.

The wood-tea may be prepared by soaking wood in water highly heated by steam. The amount of wood-tea to be added may vary very greatly, and the proportions mentioned are merely those we at present prefer to use with electrolytic solutions consisting of twelve parts, by weight, commercial sulfuric acid, fourteen parts sulfate of copper, and seventy-four parts water.

While we have sought to explain the manner in which the wood-tea acts and the causes of the trouble that we have sought to remedy, we do not wish to be understood as implying that these explanations are certainly correct or that they are in any way essential to the carrying out of our invention.

What we claim is—

The process of purifying copper from solutions containing copper with some antimony as an impurity, consisting in introducing wood-tea into the solution and then subjecting the solution to electrolysis and depositing the copper in a purified state, substantially as set forth.

In testimony whereof we have hereunto set our hands this 18th day of December, 1897.

FRANK KLEPETKO.
JOHN T. MORROW.

Witnesses:
WILLIS T. BURNS,
GEORGE F. MACUAB.